United States Patent [19]
Deolaliker

[11] Patent Number: 5,898,437
[45] Date of Patent: Apr. 27, 1999

[54] METHOD FOR FAST RENDERING OF THREE-DIMENSIONAL OBJECTS BY GENERATING LISTS OF LIKE FACING COHERENT PRIMITIVES

[75] Inventor: Vikas S. Deolaliker, Sunnyvale, Calif.

[73] Assignee: Sun Microsystems, Inc., Mountain View, Calif.

[21] Appl. No.: 08/927,325

[22] Filed: Sep. 11, 1997

Related U.S. Application Data

[63] Continuation of application No. 08/431,520, Apr. 28, 1995, abandoned.

[51] Int. Cl.$^6$ .................................................. G06T 15/00
[52] U.S. Cl. .......................... 345/421; 345/427; 345/521
[58] Field of Search ................................... 345/419, 427, 345/433–5, 420–2, 501–5, 521

[56] References Cited

U.S. PATENT DOCUMENTS 5,357,600  10/1994  Shirman .................................. 395/133

FOREIGN PATENT DOCUMENTS 0 549 183 A2  6/1993  European Pat. Off. .
6-036046  2/1994  Japan .
WO 93/00650  1/1993  WIPO .

OTHER PUBLICATIONS

Garrity, Raytracing Irregular Volume Data, *Computer Graphics*, v 24, n 5, Nov., pp. 35–40.
Shirley, et al,"APolygonal Approximation to Direct Scalar Volume Rendering", *Computer Graphics*, v 24, n 5, Nov., pp. 63–70.
Koyamada, K., "Volume Visualization for the Unstructured Grid Data", Proceding reprint form Extracting meaning from Complex Data: Processing Interaction, Display, vol. 1259,, conference date Feb. 14–16, 1990.
Sarkis Barsamian, "Use of Parallel Processors in a Photo Based Image Generator", IEEE National Aerospace and Electronics Conference, vol. 2, May 1990, pp. 688–689.

*Primary Examiner*—Phu K. Nguyen
*Attorney, Agent, or Firm*—Conley, Rose & Tayon, PC; B. Noel Kivlin

[57] ABSTRACT

A method and apparatus for fast rendering of objects or scenes on a display controlled by a computer system. The scene to be rendered is stored as a series of triangle lists in an object data file. The triangle lists are presorted by the system into front- and back-facing triangles, as determined by scalar products of the triangle's normal vector with a vector from each respective triangle to the user's selected viewpoint. An array of pointers is generated for the front-facing triangles, and another array is generated for the back-facing triangles. The object or scene is rendered by first loading the attributes for the front-facing triangles to a frame buffer controller, then processing all of the front-facing triangles sequentially, without switching back and forth between front- and back-facing triangles. The attributes for the back-facing triangles are then loaded, and the back-facing triangles are then all processed sequentially. If culling of either front- or back-facing triangles is selected by the user, then that set of triangles is not processed. The data generated in the processing of the front- and back-facing triangles are used to drive the display.

12 Claims, 8 Drawing Sheets

METHOD FOR FAST RENDERING OF THREE-DIMENSIONAL OBJECTS BY GENERATING LISTS OF LIKE FACING COHERENT PRIMITIVES

This application is a continuation of application Ser. No. 08/431,520, filed Apr. 28, 1995, now abandoned.

BACKGROUND OF THE INVENTION

The present invention relates to the rendering of three-dimensional objects in a computer system, graphics display system, or other system for rendering or printing out the scene or objects.

In conventional graphics systems, an object or scene is scanned an image of it is otherwise digitized and stored in the system as a set of data points relating to position, texture, and color. The scanned image is tessellated into sets of object elements such as polygons (typically triangles), which in the aggregate approximate the shape of the original object or scene (generally, the geometry) to the degree of resolution of the imaging and storage properties of the system.

For high-quality (high-resolution) images, as are used for example in CAD applications or molecular modeling, it has been a challenge to current systems to render the stored scenes quickly enough to make real-time motion or viewpoint alteration practical. Instead compromises have been necessary, such as either simplifying the image by reducing it to wire-frame drawings, eliminating the texture and/or simplifying the color content, or accepting a very slow rate in order to achieve high-resolution rendering.

In conventional systems, a scene is rendered (such as on a monitor, or printed on a printer) by reading the image (or "geometry") data file into the system, and rendering the triangles as a series of scan lines on the monitor or other display or image output device. The data file may be in any of a number of different conventional formats, such as in the xgl_triangle_list (xgl_multi_simple_polygon) format, which is a standardly used format among workstation manufacturers. For a discussion of a conventional such procedure for polygon representation in data files, see Foley, van Dam, et al., *Computer Graphics/Principles and Practice*, pp. 473 et seq. (Addison Wesley, 2d Ed. 1987)

When the image read into the rendering system (such as in the format of a list of triangles), it is then processed in a standard procedure as illustrated by the flow chart of FIG. 1. The steps 10–110 indicated in this flow chart are standard in the field of computer graphics. A discussion of object rendering may be found, for example, in the aforementioned *Computer Graphics/Principles and Practice*, at pages 806 et seq. A system for rendering three-dimensional images in a fashion similar to that of FIG. 1 is discussed, for example, in the article "Leo: A System for Cost Effective 3D Shaded Graphics", COMPUTER GRAPHICS Proceedings, Annual Conference Series (1993). Each of the foregoing publications is incorporated herein by reference.

One of the steps carried out by a graphics driver in the process of rendering a scene is that of face determination (see box 40 in FIG. 1). This includes determining whether a given triangle's predefined "front" face is visible from a particular point of view selected by the user. The "front" face is defined in advance by the particular rendering system by, for example, a vector normal to the surface of the triangle, with the direction of the vector (and hence the direction of the front face) being determined by a right-hand (or, optionally, left-hand) rule traversing the three vertices of the triangle in an order determined by the manner in which they are stored in the triangle's data structure. For instance, in FIG. 1A, the three points 200–220 determine the direction of the normal vector 230, and hence the side of the triangle 205 that is to be defined as the front face 240.

In general, there may be three components to the face determination step, all of which may be selected by the user: (1) face distinguishing, meaning applying different attributes (such as color) to the front faces than to the back faces; (2) culling of the front- or back-facing triangles; and (3) flipping of normals of the triangles.

Face distinguishing is a technique particularly used in molecular imaging or medical imaging systems to render multiple surfaces of a scene. In other types of systems (such as MCAD), the invisible faces may simply be culled out.

In prior systems, the graphics driver maintains the list (or "strip") of triangles as a single entity, and thus performs calculations for face culling and face distinguishing on each one of the triangles. This involves both intensive processor usage and heavy memory access to the image file. It would be preferable to arrive at a system that could intelligently determine which triangles are to be rendered for display, and preferentially access and process those triangles.

Another characteristic of current systems is that they process front- and back-facing triangles in the order in which they are accessed in the triangle lists. While this is a simple approach, it can be inefficient because it results in repeated memory accesses to the image file, leading to memory access being a bottleneck for the rendering procedure. It would therefore be useful to provide a system wherein the memory accesses are made more efficient by advance determination of which triangles should be rendered, and in which order. A procedure for making such a determination is needed.

When triangles are accessed as noted, in the order in which they are stored (intermixed front- and back-facing) in the object data file, and a procedure such as that shown in FIG. 1 is used, the transformation of vertices of the triangles (see box 20) from model space (i.e. the data file's reference coordinate system) into device space (i.e. the display or screen coordinate system) takes place before the step of face determination (see box 40), and hence before it is determined whether the triangle being transformed is even to be visible on the screen for the selected viewpoint. For instance, if back culling is selected, then none of the back-facing triangles should be shown, and any processor time taken in transformation of the vertices of back-facing triangles is squandered. Since vertex transformation is a very processor-intensive, time-consuming procedure, such an approach is wasteful of resources and slows down the rendering process.

SUMMARY OF THE INVENTION

The system of the present invention involves a graphics display system using face determination for presorting a list of triangle from an image file. The front faces of the scene are then processed, following which the back faces are processed. This reduces memory accesses, since generally speaking the front faces are stored at addresses in memory close to one another, and likewise for the back faces. Accordingly, processing front and back faces separately is far less likely to result in cache misses to the main memory, and in addition reduces the number of state changes in the frame buffer control (i.e. the number of times the CPU has to write to the frame buffer control registers), thus speeding up the entire rendering procedure. The use of this approach has led to quite improved processing times in applicant's tests on a system implementing the invention.

The system of the invention also uses face culling, i.e. a user-determined choice of whether to render back faces, front faces or both. Omitting to render either the back or the front faces also speeds up the display process, not only due to the fact that a certain number of the triangles (either all the front-facing triangles or all the back-facing triangles) will not be rendered, but also a result of the preliminary identification of triangles as front- or back-facing and the creation of lists of pointers into the data files for each type, again minimizing memory accesses and writes to the frame buffer registers.

DESCRIPTION OF THE PREFERRED EMBODIMENTS

Figure 2:
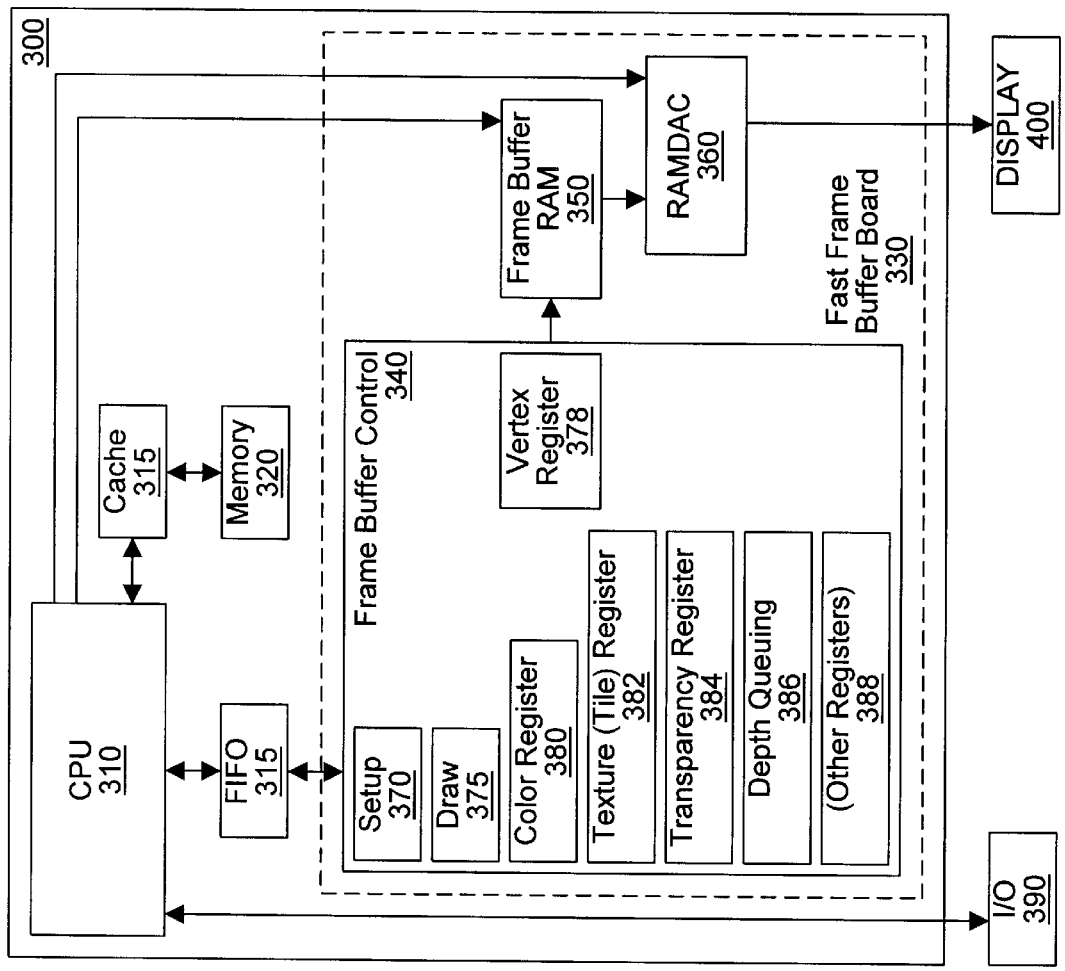
FIG. 2 is a block diagram of the apparatus of the present invention.

In FIG. 2, a graphics system 300 is shown in connection with which the rendering mechanism of the invention may be implemented. The system 300 includes a processor such as CPU 310 and an associated memory 320, both of which may be conventional apparatus. A fast frame buffer board 330 is used in the system 300, and includes a frame buffer control 340, a frame buffer RAM 350, and a RAM digital-analog converter (RAMDAC) converter 360. The processor 310 is preferably connected to the frame buffer control 340 via a FIFO queue 315.

The frame buffer control 340 may constitute an ASIC with its own circuitry (processor, logic, and software for use in the processor, as desired) and modules such as setup module 370 and draw module 375. The frame buffer control may be configured in a variety of ways, including entirely as a specially designed ASIC, as a module with a graphics processor and memory with instructions to be executed on the processor, or some other combination of hardware and software. Preferably, the frame buffer board 330 is selected to be particularly fast at scene rendering, including write rates to the frame buffer RAM 350.

The frame buffer control 340 also includes a vertex register 378 for storing vertices of triangles. In the preferred embodiment, only one triangle at a time (i.e. three vertices) is stored in vertex register 378, though designs may be arrived at where a plurality of triangles may be stored. Also included in the frame buffer control are triangle attribute registers, such as color register 380, texture (or tile) register 382, transparency register 384, depth queueing register 386, and other attribute register 388 as desired. These registers store conventional triangle attribute data.

The system 300 also includes input and output devices 390 and a display 400, which may be a monitor, screen, printer, or any other computer-driven device for rendering images for viewing.

The method of the invention is carried out by the processor 310 under the control of program instructions stored in the memory 320, for the most part, with certain functions as specified below carried out by hardware and/or program instructions carried on or by the fast frame buffer board (including the frame buffer control, the frame buffer RAM and the RAMDAC). These program instructions may be regarded logically, and may be actually constructed, as functional modules for carrying out each of the rendering and display functions discussed below.

Representation of Objects by Triangles

Figure 3:
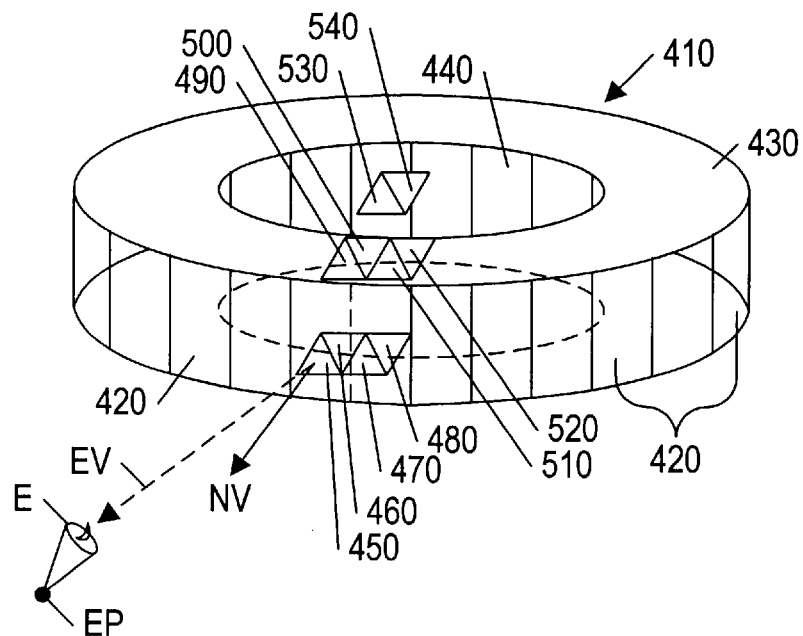
FIG. 3 is a diagram illustrating the procedure for tessellating a scene into polygons.

FIG. 3 illustrates a scene or object 410 which is to be scanned or otherwise reduced to a digital file form. Typically, the object would be scanned, and its image would be digitized and stored, and then the stored image would be tessellated, i.e. broken down into triangles. Object 410 will typically have multiple surfaces such as surfaces 420, 430 and 440. Each surface is tessellated for representation as strips of triangles, such as: triangles 450–480 on surface 420; triangles 490–520 on surface 430; and triangles 530–540 on surface 440. It will be understood that the entirety of each surface is represented by triangles; these are shown only in part for purposes of clarity.

Each of the triangles 450–540 is either "front-facing" or "back-facing", which is determined as follows. Each triangle has associated with it a vector normal to its virtual surface, as mentioned above, and as conventionally defined in field of computer graphics. For instance, triangle 450 has associated with it a normal vector NV, showing the direction of its front surface. Triangle 450 is either front-facing or back facing depending upon the direction of the vector NV with respect to an "eye vector" EV drawn from the triangle 450 to a user-selected viewpoint (or eyepoint) EP; eye E indicates the viewpoint of the scene or object selected by the user of the system 300.

The triangle 450 is front-facing if the dot (scalar) product of vector NV with vector EV is positive, and otherwise it is back-facing. In a relatively simple object such as object 410, given a right-hand rule for determining the normal vectors for all the triangles, each of the ten triangles 450–540 would be front-facing; however, in more complicated objects, front- and back-facing triangles may alternate with one another.

Figure 4:
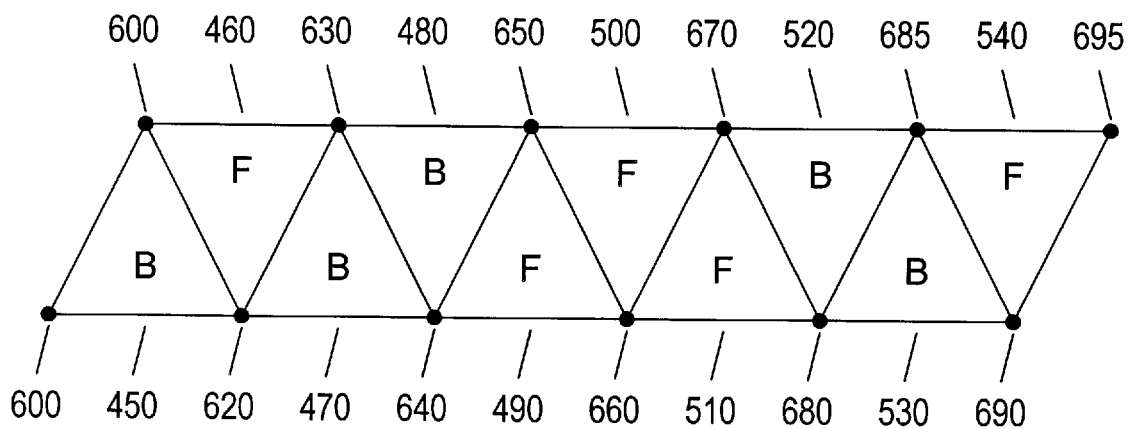
FIG. 4 is a diagram illustrating a series of triangles representing a portion of the scene of FIG. 3.

FIG. 4 illustrates a portion of a triangle strip (showing the ten triangles 450–540 in this case) that would be stored in the triangle list (i.e. object data file) in memory, representing the object 410. (There would, of course, be many more triangles to represent the object 410, but in the present discussion only these ten will be discussed.)

Each of the triangles 450–540 in FIG. 4 is marked with a "B" or an "F", to indicate whether it is front- or back-facing. As stated above, for the particular object 410 shown in FIG. 3, all of these triangles would (quite likely) be front-facing; however, to illustrate the invention it will be assumed that some are front-facing and some are back-facing, as indicated.

Structure of the Split Lists

Figure 1:
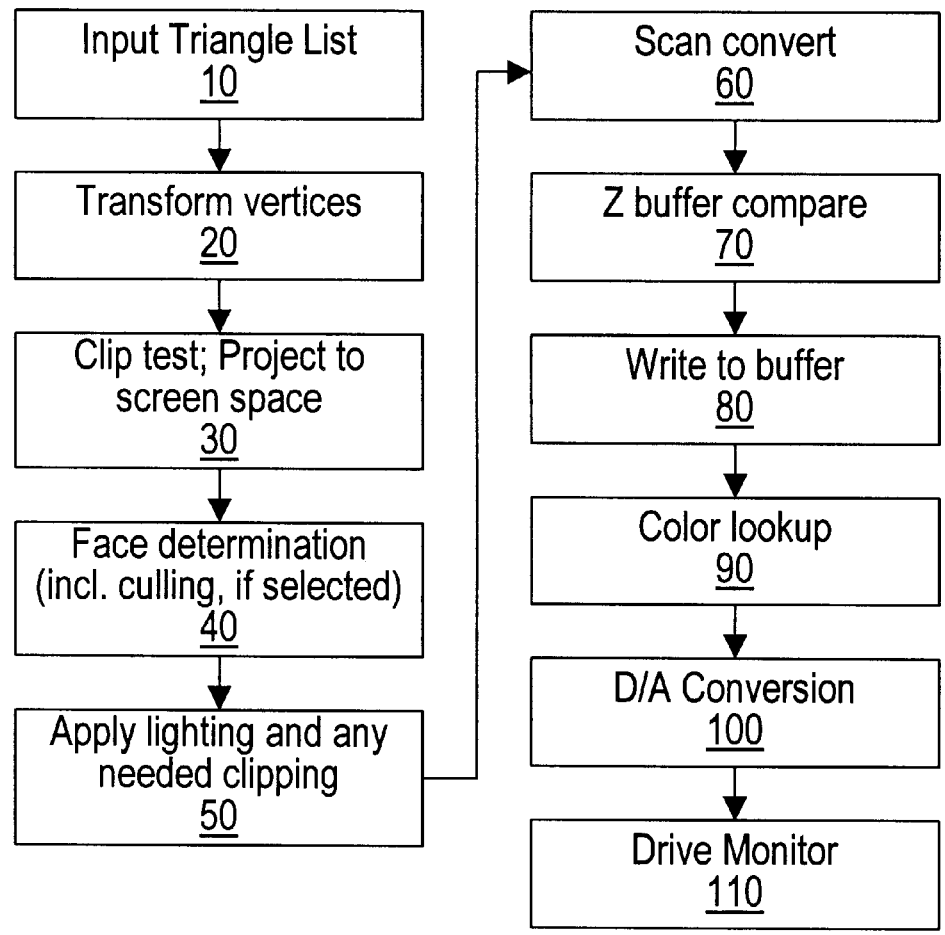
FIG. 1 is a flow chart depicting a prior approach to rendering three-dimensional scenes.
Figure 1A:
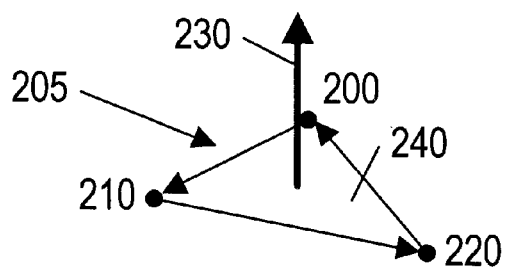
FIG. 1A is a diagram illustrating the determination of a front face of a triangle.

In conventional approaches to object rendering, the procedure illustrated in FIG. 1 would traverse the list of triangles (i.e. the object data file) representing the triangles 450–540 in the order in which they are generated and stored, i.e. the order shown in FIG. 4, which represents triangles 450–540. Vertices 600–695 define the triangles 450–540, and are stored in the data file as a representation of these triangles. Various configurations for data structures representing the triangles and their associated vectors are known and may be used with the present invention; for example, in some systems the vector data are stored along with the vertices in the data file, while in others the rendering system calculates the vectors, given the three vertices for each triangle. It is typical that adjacent triangles share vertices, e.g. that triangle 450 is defined by vertices 600–620, while triangle 460 is defined by vertices 600 and 620–630, thus sharing two vertices with triangle 450.

The present invention generates and stores a data structure 700 (see FIG. 4A) including pointers to the triangles in the data file, split into two separate logical arrays of pointers, one array 702 including pointers to the addresses in memory of the front-facing triangles, and the other array 704 including pointers to the addresses in memory of the back-facing triangles.

Thus, array 702 includes a pointer FrontPtr1 to the first location in main memory where a triangle having a front-facing surface is stored, and also includes a size F1 which indicates how many front-facing triangles in a row are stored beginning at that location. Similarly, array 704 includes a pointer BackPtr1 to the first location in main memory where a triangle having a back-facing surface is stored, and also includes a size B1 which indicates how many back-facing triangles in a row are stored beginning at that location. This can be understood by reference to FIG. 4, where triangle 450 is the first triangle, and also the first back-facing triangle, of the entire list (for this example), and would be stored at the first address in memory containing the data file relating to a given object. Thus, BackPtr1 would point to the address in memory where triangle 450 (or its first vertex 600) is stored, and SizeF1 would be 1 (or, equivalently, an indicator of the number of addresses, including the first address, required to fully identify triangle 450, which will typically be three— one for each vertex—or six, i.e. one for each vertex plus three to identify the normal vector).

The size information (e.g. B1) is used during the processing of the front- and back-facing triangles to identify how many triangles in a row are front- or back-facing in the portion of the data file being accessed.

In this example, FrontPtr1 will point to the address location for triangle 460, and SizeF1 will be 1. BackPtr2 will point to the address location for triangle 470, and SizeB2 will in this case be 2, since there are two back-facing triangles (470 and 480) in a row in this particular triangle list. Next, FrontPtr2 will point to the address for triangle 490, and SizeF2 will be 3, reflecting the three triangles 490–510. Finally, BackPtr3 will point to the address for triangle 520, and SizeB3 will be 1.

These exemplary values would be the entire reference needed for the invention to access the front- and back-facing triangles of a data file in memory including the triangles shown in FIG. 4. How this list is used, and the details for its generation, are described below.

Rendering of Objects Using Split Lists

Figure 5:
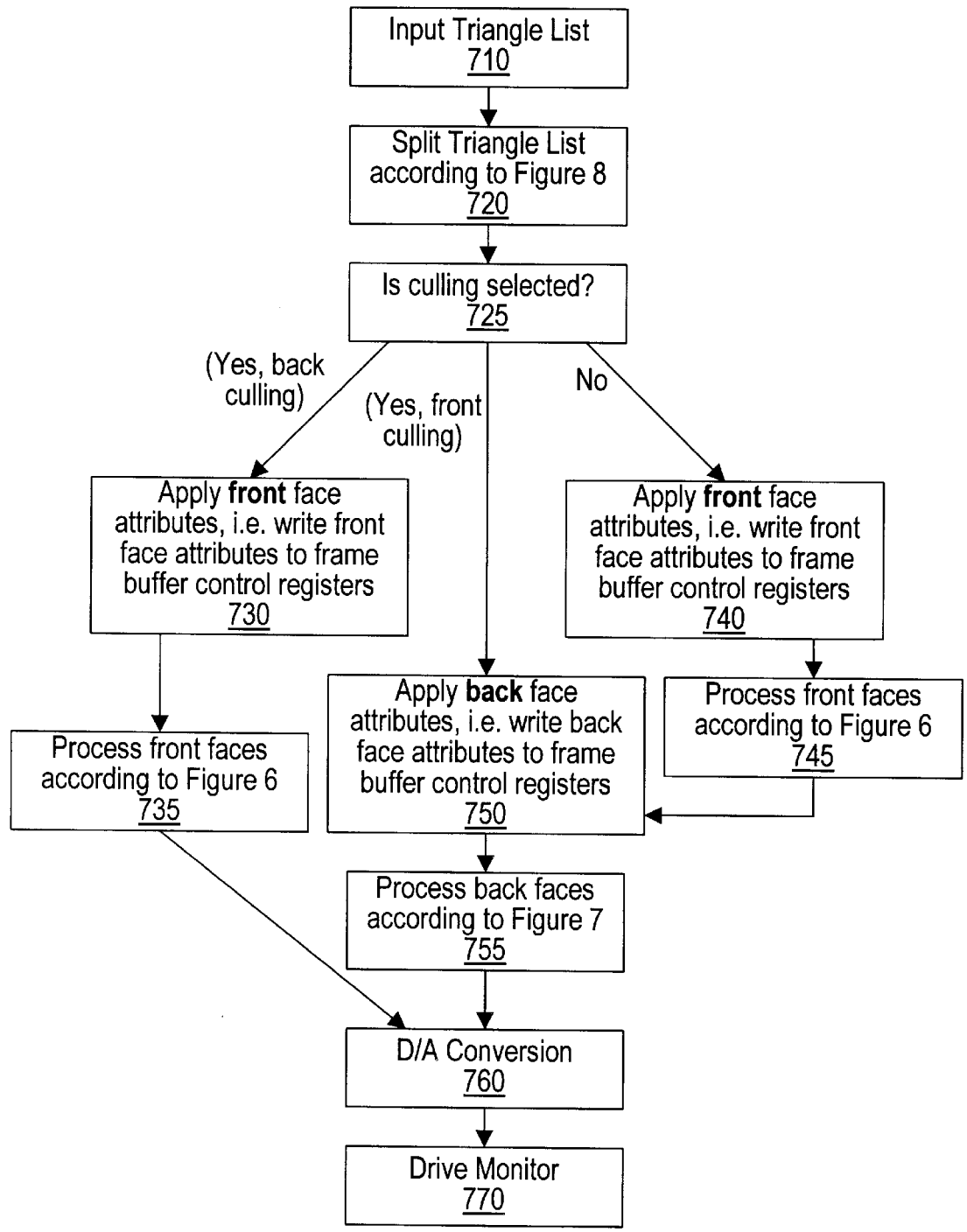
FIGS. 5–7 are flow charts depicting the method of the invention.

The flow chart of FIG. 5 illustrates the method to be followed according to the invention to process the triangles of a given triangle list. At step (box) 710, the triangle list is input, i.e. read from memory, and at box 720, the triangle list is split into to the two separate arrays of triangle lists discussed above: a first array 702 including pointers to the front-facing triangles, and a second array 704 including pointers to the back-facing triangles.

The user may select to cull either the front-facing triangles or the back-facing triangles, or neither, as indicated at box 720. Culling is a technique commonly used in today's graphics system, but conventional systems have not used split lists, and therefore culling has been on a triangle-by-triangle basis. In the data file representing the triangles 450–540 in FIG. 4, for example, if back-culling is selected the system would in current systems have to decide at each triangle whether it's front- or back-facing, and reject the back-facing triangles so as to display only the front-facing triangles.

Thus, the culling decision of box 725 in FIG. 5 is simplified to a decision about whether to use array 702 or array 704 (shown in FIG. 4A), or both, in the rendering of the object or scene. If back culling is selected by the user, then the front faces (i.e. the front-facing triangles) are processed (boxes 730–735) according to the method shown in FIG. 6. If front culling is selected, then the back faces (i.e. the back-facing triangles) are processed (boxes 750–755) according to the method shown in FIG. 7. If no culling is selected, then the rendering procedure begins with processing the front faces (boxes 740–745) and then processes the back faces (boxes 750–755). The reverse order may also be selected, but processing them in this order is advantageous in that it is less likely to result in the rendering of triangles that will end up being invisible from the selected point of view.

At box 730 of FIG. 5, the processor 300 (see FIG. 2) reads the front face attributes from the memory 320, and writes them to the attribute registers 380–388. Note that this needs to be done only once for each triangle list, i.e. only once for the processing of the entire array 702 (as in boxes 735 and 745), and then again once for processing of the entire array 704 (as in box 755). As a result, reading this information from memory and writing it to the registers 380–388 are carried out only a single time during the rendering procedure each of the lists of front- and back-facing triangles. By way of contrast, as noted above, with prior systems this attributes information would have to be read from memory and loaded into the registers each time a triangle is encountered that is facing a different direction from the previous triangle.

At box 760, the digital-to-analog conversion of the triangles is carried out in conventional fashion, e.g. the conversion from RGB data to analog signals for the particular monitor being used, and at box 770 the monitor is driven using generated analog signals.

Processing of the Individual Triangles

Figure 6:
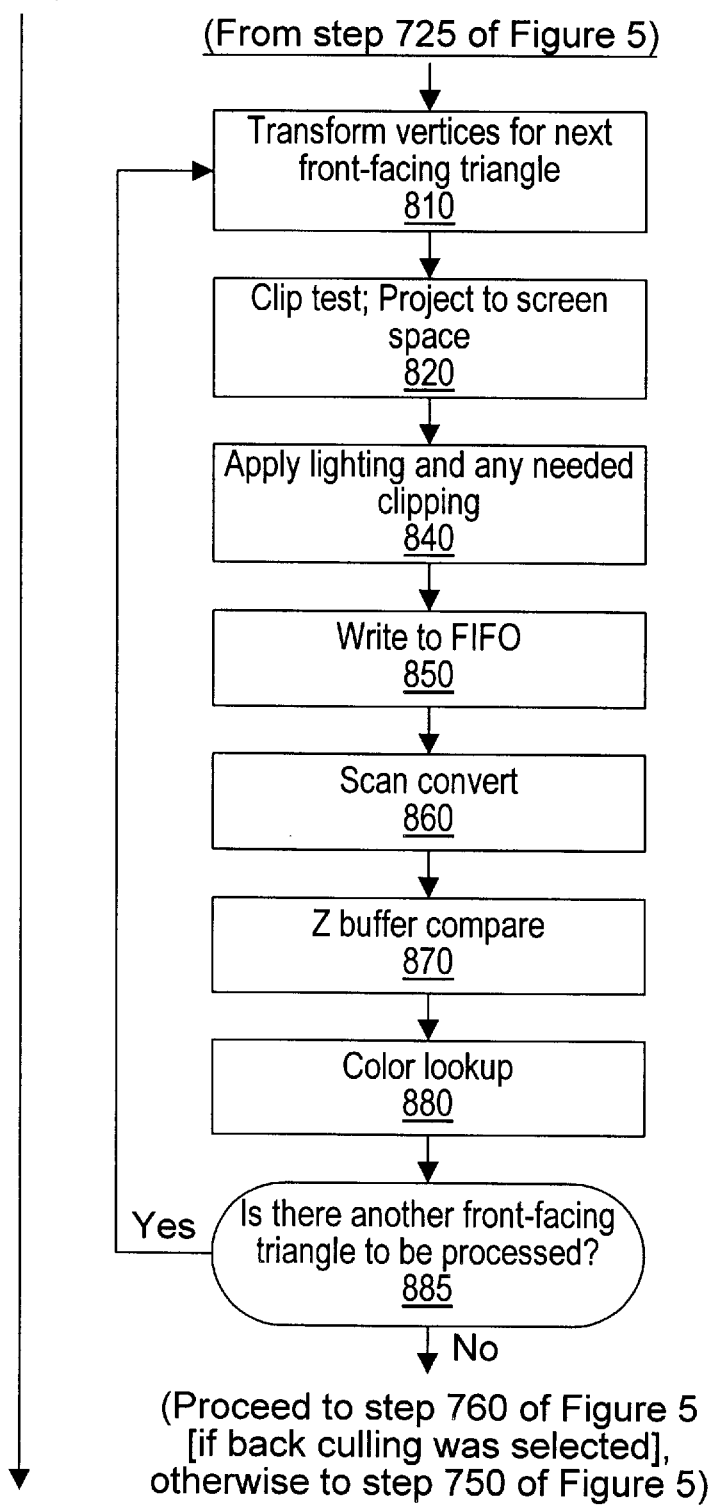
Figure 7:
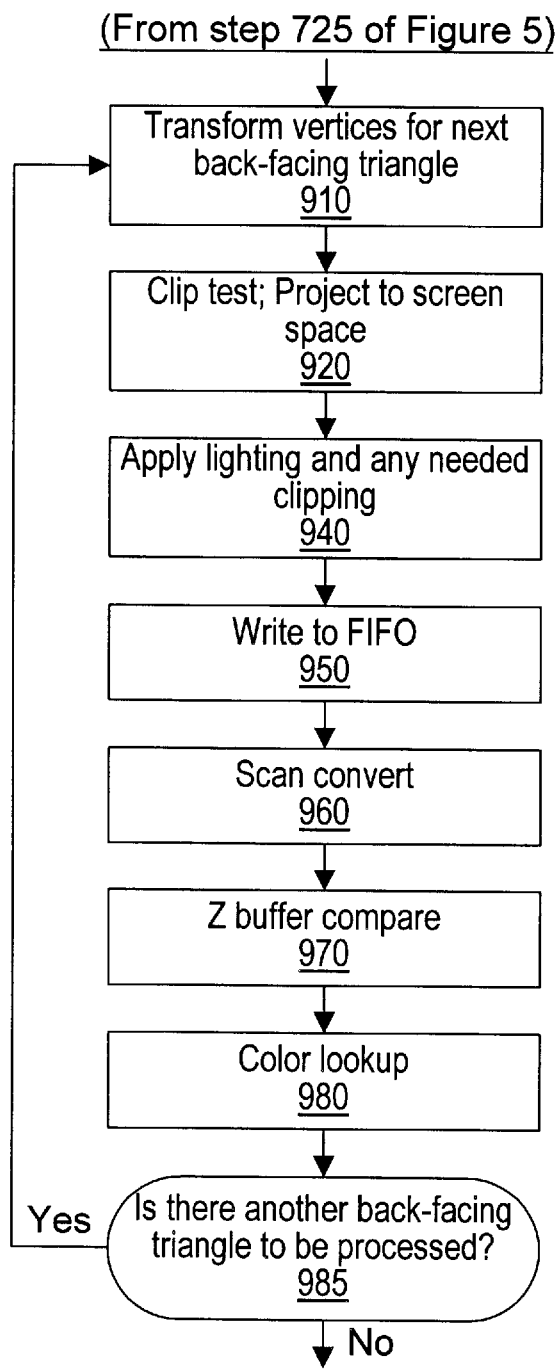

FIGS. 6 and 7 show the methods for processing the front faces and back faces, respectively, as indicated in boxes 735, 745 and 755 of FIG. 5. The two methods are identical but for the fact that one processes front-facing triangles, and the other processes back-facing triangles. Steps 810–880 (and likewise the identical steps 910–980, respectively) may be carried out in a conventional manner, such as in the manner discussed in the aforementioned background references, except for the important fact that all of the front-facing triangles are triangles are processed sequentially, i.e. without switching to the processing of back-facing triangles; and the back-facing triangles are likewise processed sequentially.

The following comments with respect to FIG. 6 also apply to the processing of back-facing triangles as in FIG. 7 by the use of the array 704.

When the steps shown in FIG. 6 are carried out, only the array 702 need be accessed, since only the front-facing triangles are being processed. The loop of steps 810–880 is carried out for each of the front-facing triangles; e.g., step 810 for the first pass through this loop would access triangle 450 in FIG. 4. In this step, the vertices of the current front-facing triangle are transformed from model coordinate space to device coordinate space (i.e. display or screen space), and the normal for the triangle is calculated. The triangle is then projected to screen space and tested for clipping as necessary at box 820.

At box 840, lighting calculations and clipping calculations are executed by the processor. The resulting data are then written (at box 850) to the FIFO 315 (i.e. the CPU writes to the frame buffer board's queue), and at box 860 the scan conversion step is executed. This is done in the conventional manner, i.e. first by the setup module 370 taking the current triangle's data in the FIFO and setting it up (i.e. writing it to the vertex register 378), and then by the draw module converting the relevant triangle data to pixel data (i.e. scanline data) by interpolating or looking up color values as needed, and then writing the pixel data to the frame buffer RAM 350.

At box 870, the standard Z buffer comparison is executed, i.e. the it is determined for each pixel to be written whether it has the highest (frontmost) Z-value; if there is a Z-value higher, then that means another pixel would be written over it, and that pixel is not stored in the frame buffer RAM. In the preferred embodiment, this process is carried out by the frame buffer RAM 350, which for this purpose includes associated logic (hardwired and/or including a processor with software instructions) to carry out the Z buffer comparison. Alternatively, the Z buffer comparison may be done before writing to the frame buffer, as in prior systems (see boxes 70 and 80 in FIG. 1).

At box 880, the color lookup is carried out, i.e. the RAMDAC 360 looks up the color for each pixel in the frame buffer, takes the RGB (or other format) value for that color, and inputs this to the digital-analog converter (DAC) to drive the monitor.

At box 885, it is determined whether there is another front-facing triangle to be processed. If so, the method proceeds to step 810 to continue processing further front-facing triangles. Once all of the triangles in the front-facing triangle list have been processed, the method proceeds to box 760 if back culling was selected (i.e., by way of steps 725–730–735–760); or it proceeds to step 750 (from by way of steps 725–740–745) if no culling was selected, so that the system can now process the back-facing triangles.

As indicated above, the method of FIG. 7 is exactly analogous to that of FIG. 6, but applied to the back-facing triangles.

Using the method depicted in FIG. 5, since the triangle list-splitting is done in advance, the culling selection and application of attributes can be carried out before any of the steps of FIGS. 6 and 7, including the time-consuming steps of vertex transformation, projection to screen space, etc., and the concomitant reads from memory and writes to the FIFO 315 and the registers 378–388 (in FIG. 2). Since each triangle list (represented by the arrays 702 and 704 in FIG. 4A) has a number of shared attributes, it is efficient to transfer these together. In addition, since triangles that are close to one another tend to have similar characteristics, caching data for such triangles at the same time contributes efficiency, since the respective data are likely to be stored near one another in memory (which may be referred to as the principle of memory locality). Hence, the foregoing method results in considerably greater overall efficiency, and improved speed, of the rendering process.

Generation of the Split Lists

Figure 8:
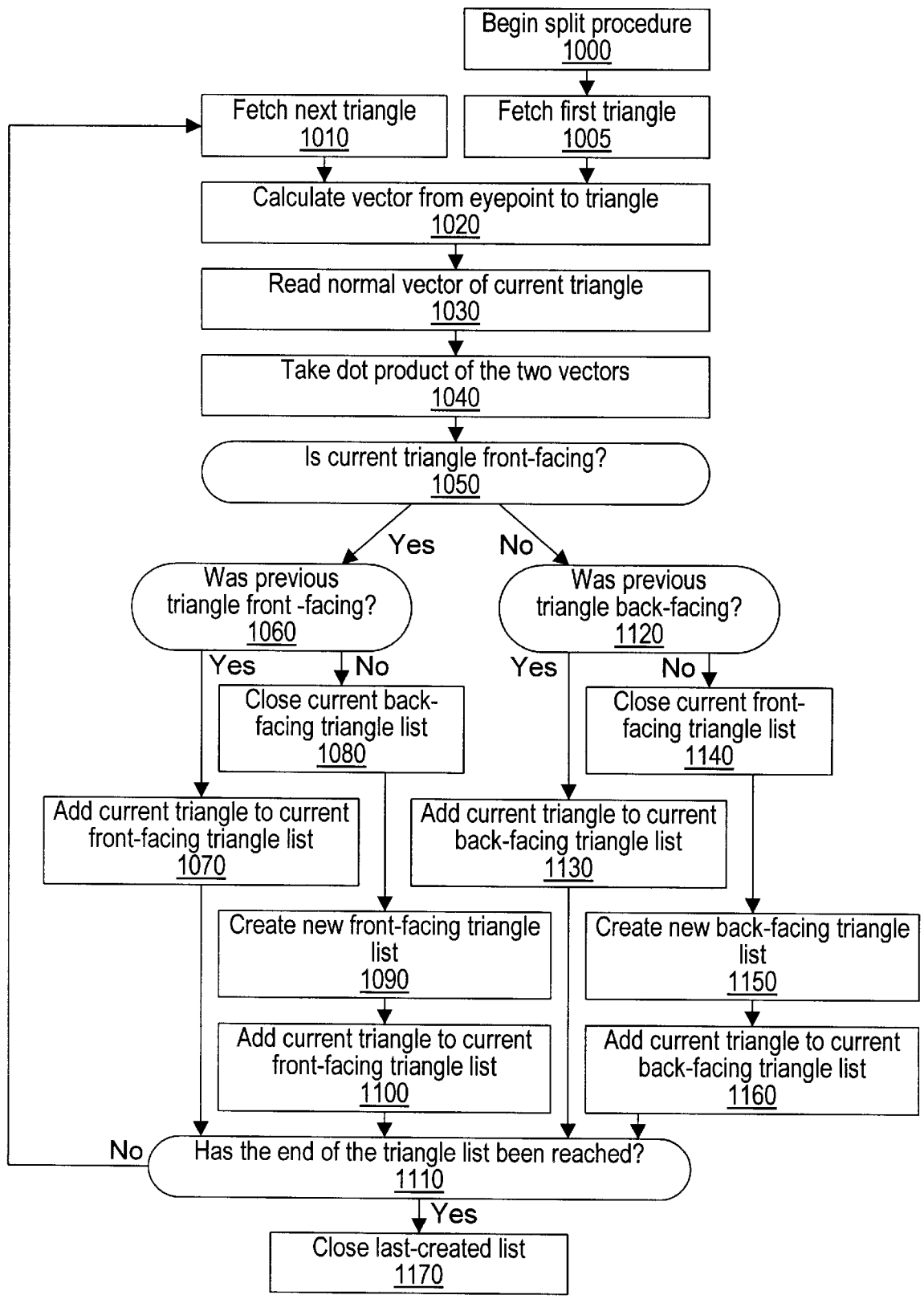
FIG. 8 is a flow chart illustrating the method of the invention for splitting front- and back-facing triangles into separate lists.

The flow chart of FIG. 8 illustrates details of the triangle splitting procedure, beginning at box 1000. The processor begins with the information about the selected viewpoint relative to an object or scene stored as a particular data file. Appendix A attached hereto is one example of a possible implementation of the triangle list-splitting procedure of FIG. 8.

At box 1005, the first triangle is fetched, i.e. the processor 310 retrieves the data representing the first triangle from memory, i.e. the vertices. At step 1020, the eye vector EV (see FIG. 3) for the first triangle is calculated, and at step 1030, the normal vector NV for the current triangle is either read (if it is available as part of the object data file) or calculated. The scalar (dot) product of the vectors EV and NV for the current triangle is determined at box 1040.

In the present embodiment, the dot product is calculated in the model coordinate system (note that the conversion to device coordinates takes place later in the method, i.e. in each of steps 730–750, which appear in FIG. 5 and are detailed in FIGS. 6–7). In conventional systems, there is a preceding step of back-transformation (from screen coordinates to model coordinates) in order to determine whether the triangle is front- or back-facing; in the present system, this is avoided because it has already been determined whether each given triangle is front- or back-facing.

At box 1050, the system determines from the sign of the dot product whether the current triangle is front-facing; if it is a positive dot product, the triangle is front-facing, and if the dot product is negative, the triangle is back-facing. Assuming for this example that the triangle list in FIG. 4 is being referred to, then at this step it is determined that the current triangle 450 is back-facing, and box 1120. This being the first triangle, it is determined here that the previous triangle (there is no "previous" triangle as yet) was not back-facing. Step 1140 is irrelevant for this first pass. At box 1150, a new back-facing triangle list is generated, pointers and variables are set up as necessary to create the data structure 704.1 shown in FIG. 4A. (The size of this first list is not yet known.)

The current (first) triangle is now added to the newly-created triangle list at box 1160, i.e. a pointer BackPtr1 is added to the list, pointing to the correct address in memory 320 where the data for this triangle (including vertices 600–620) are found.

At box 1110, it is determined that the end of the triangle list has not been reached (referring still to the ten-triangle list of FIG. 4), so the method proceeds to box 1010, where the next triangle 460 is fetched. The steps at boxes 1020 are followed as before, and at box 1050 it is determined that the current triangle is front-facing, so box 1060 is reached. Here, it is determined that the previous triangle was not front-facing, so box 1080 is reached, where the previously generated triangle list is closed. This includes resetting pointers as needed, and in particular storing the size of the previous triangle list as SizeB1.

At box 1090, a new front-facing triangle list 702.1 (see FIG. 4A) is generated, identical in structure to the back-facing triangle list 704.1. At box 110, triangle 460 (i.e. the pointer thereto) is added to triangle list 704.1, and at box 1110 the method proceeds back to box 1010.

On this next loop through the method of FIG. 8, the triangle list 702.1 is also closed out with a length of one (i.e.

SizeF1 indicates there is only one triangle in this list), and the new triangle 470 becomes the first triangle in a newly generated back-facing triangle list 704.2 (see FIG. 4A again), and triangle 480 is added to this list at the next loop. SizeB2 thus becomes 2, followed by the generation in the next three loops of another triangle list 702.2 including the three front-facing triangles 490–510. Next, a list (which would be 704.3) with SizeB3=2 is generated, including back-facing triangles 520 and 530. Finally, a list of one triangle 540 is generated, which would be 702.3. Thus, for this example, M=N=3 in FIG. 4, though in general M and N will not be the same. The values of M and N depend upon how many discontiguous lists of triangles are generated from the front- and back-facing lists of triangles, respectively.

When triangle 540 has been processed and box 1110 is reached in FIG. 8, then box 1170 is reached and the method closes out the list 702.3, including setting SizeF3=3.

Figure 4A:
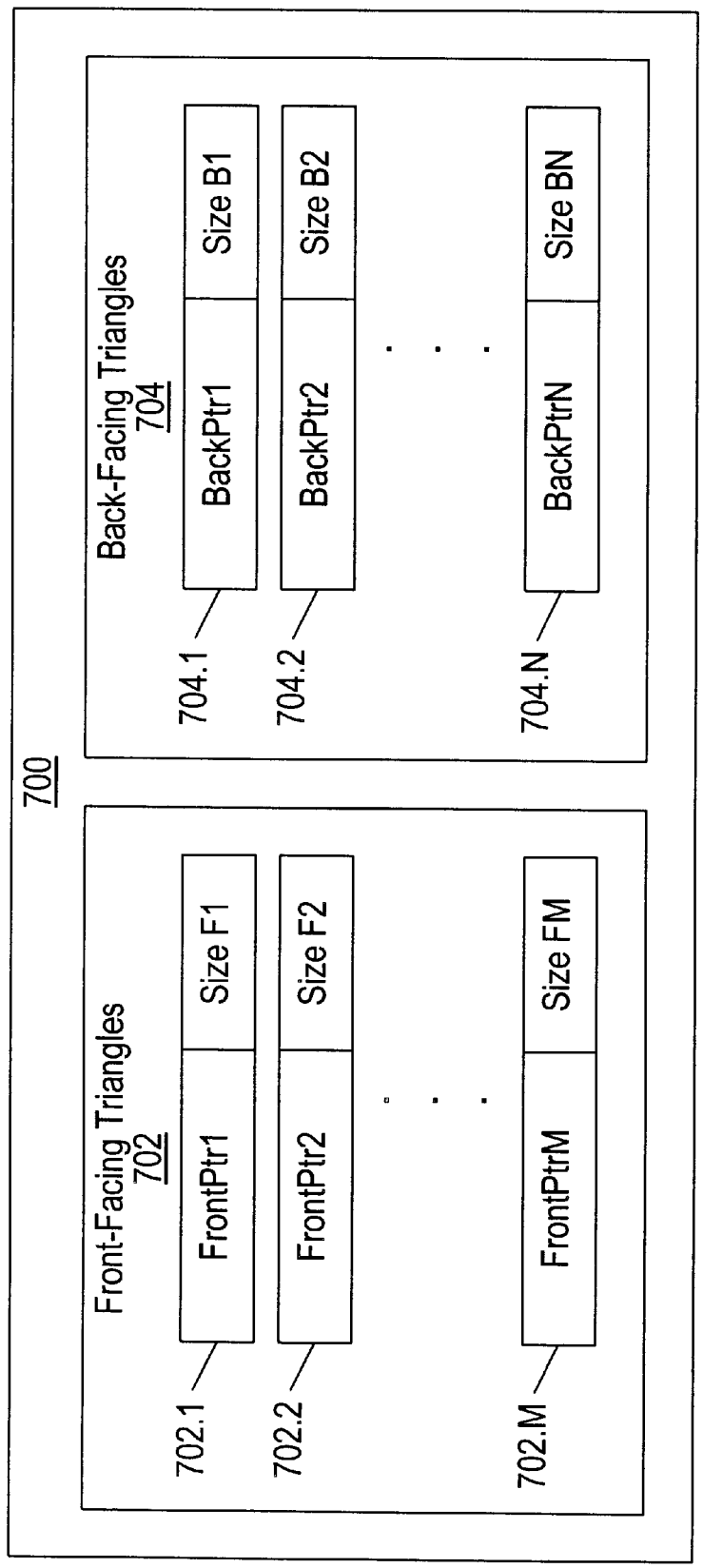
FIG. 4A is an illustration of the structure of front and back split-list arrays according to the invention.

The result of this procedure is to generate the lists of triangles 702 and 704 shown in FIG. 4A. Now, as described above, when the method of FIG. 5 is followed, only one list of triangles (actually, pointers to the triangles stored in the memory) is accessed at a time. Thus, the entire set of attributes of the front-facing triangles is loaded from memory to cache by the CPU, and is also written to the frame buffer control registers. Neither of these steps needs to be repeated until all of the front-facing triangles have been processed as in box 730 of FIG. 5, and likewise these loads and writes are carried out only once for the processing of all the back-facing triangles as at box 750. With the alternative being carrying out these loads and writes once for each time a triangle is reached where the previous triangle faced in the other direction, it is clear that a considerable number of clock cycles are saved by the method of the present invention.

In the preferred embodiment, as noted, splitting the lists of triangles actually means generating arrays of pointers to the data file, one array for the front-facing triangles and one array for the back-facing triangles. If desired, the actual data files may actually be split, though this would require memory devoted to storing the newly generated split data files. Splitting the lists may be interpreted herein as generating the lists/arrays of pointers, with our without the step of actually generating split data files.

The method and apparatus of the invention have been described with respect to front- and back-facing triangles. The method is more broadly applicable, however, in general to processing triangles (or other data objects) that may be classified into two or more categories, where for the processing of each category certain steps need to be carried out that may be consolidated for efficiency into a single operation, and the data objects can then be processed category by category after the execution of the respective operations relating to them.

Appendix A: Sample C-Code for Generating Split Lists

```
#include <xgl/xgl.h>
#ifndef NUMFACETS
#define NUMFACETS 12
#endif
#define ALLFRONT1
#define ALLBACK-1
#define ALLMIXED0
Xgl_pt_f3deyePoint = {1.0, -1.0, 1.0};
Xgl_pt_list globalFPtList[NUMFACETS]; /* Prepare for worst case */
```

-continued

Appendix A: Sample C-Code for Generating Split Lists

```
Xgl_pt_list globalBPtList[NUMFACETS];
/*
 * Routine to split the input pointlist into front pointlist and back
 * pointlists. It takes in the facetnormals to test for facet direction.
 * It returns a pointer to front and back pointlists and number of front
 * and back pointlists. The return value of the function is a flag which
 * tells if the pointlist is all front facing or all back facing.
 */
void
splitLilTStrip(Xgl_facet_list *fl, Xgl_pt_list *pl, Xgl_pt_list **fpl,
        Xgl_pt_list **bpl, int *numFPtList,int *numBPtList)
{
    int        j,startj;
    int        allFront=0, allBack=0;
    int        numPts, numIPts;
    int        front;
    int        localNumFPtList, localNumBPtList;
    int        lastWasBack, lastWasFront;
    float   x,y,z;
    float   eyeDotNormal;
    float   eyeVectorX, eyeVectorY, eyeVectorZ;
    float   eyePointX, eyePointY, eyePointZ;
    Xgl_pt_normal_f3d *iPts;
    Xgl_normal_facet*facetNormal;
    Xgl_pt_list*localFPtList;
    Xgl_pt_list*localBPtList;
    Xgl_pt_f3deyeVector;
    localNumFPtList = localNumBPtList =0;
    lastWasBack = lastWasFront =0;
    startj = 0;
    numIPts = pl->num_pts;
    iPts = pl->pts.normal_f3d;
    facetNormal = fl->facets.normal_facets;
    localFPtList = &globalFPtList[localNumFPtList];
    localBPtList = &globalBPtList[localNumBPtList];
    eyePointX = eyePoint.x;
    eyePointY = eyePoint.y;
    eyePointZ = eyePoint.z;
    /* Determine the first facet direction */
    iPts += 2; /* For consistency use the last point of the facet */
    eyeDotNormal = (((eyePointX - iPts->x) *
            facetNormal->normal.x) +
            ((eyePointY - iPts->y) * facetNormal->normal.y) +
            ((eyePointZ - iPts->z) * facetNormal->normal.z));
    /* Fill the front and back pointlist */
    if (eyeDotNormal > 0.0f){
      localFPtList[localNumFPtList].pt_type =
          XGL_PT_NORMAL_F3D;
      localFPtList[localNumFPtList].bbox = NULL;
      lastWasFront =1; allFront = ALLFRONT;
    }else{
      localBPtList[localNumFPtList].pt_type =
          XGL_PT_NORMAL_F3D;
      localBPtList[localNumFPtList].bbox = NULL;
      lastWasBack =1; allBack = ALLBACK;
    }
    /* Process the rest of the points */
    facetNormal++; iPts++;
    for (j=3; j < numIPts; j++, facetNormal++, iPts++){
      /* Face Determination */
      eyeDotNormal = (((eyePointX-iPts->x) * facetNormal->normal.x)+
          ((eyePointY-iPts->y) * facetNormal->normal.y)+
          ((eyePointZ-iPts->z) * facetNormal->normal.z));
      /* Create Front and Back PointLists */
      if (eyeDotNormal > 0.0f){
        if (lastWasBack){
          if (allBack) allBack =0;
          /*Close the back pointlist */
          localBPtList[localNumBPtList].num_pts = j - startj;
          localBPtList[localNumBPtList].pts.normal_f3d = iPts-j-startj;
          lastWasBack =0;
          localNumBPtList += 1;
          /*Start a front pointlist */
          localFPtList[localNumFPtList].pt_type =
              XGL_PT_NORMAL_F3D;
          localFPtList[localNumFPtList].bbox = NULL;
          lastWasFront =1; startj =j-2;
        }
```

Appendix A: Sample C-Code for Generating Split Lists

```
    }else{
      if (lastWasFront){
        if (allFront) allFront =0;
        /*Close the front pointlist */
        localFPtList[localNumFPtList].num_pts = j-startj;
        localFPtList[localNumFPtList].pts.normal_f3d = iPts-j-startj;
        lastWasFront = 0;
        localNumFPtList += 1;
        /*Start a back pointlist */
        localBPtList[localNumBPtList].pt_type =
            XGL_FT_NORMAL_F3D;
        localBPtList[localNumBPtList].bbox = NULL;
        lastWasBack = 1; startj =j-2;
      }
    }/*else back*/
  } /*for*/
  /* Close the pointlist */
  if (lastWasFront) {
    localFPtList[localNumFPtList].num_pts = j-startj;
    localFPtList[localNumFPtList].pts.normal_f3d = iPts-j-startj;
    localNumFPtList += 1;
  }else if(lastWasBack){
    localBPtList[localNumBPtList].num_pts = j-startj;
    localFPtList[localNumFPtList].pts.normal_f3d = iPts-j-startj;
    localNumBPtList += 1;
  }
  /* Output the number of pointlist */
  *numFPtList = localNumFPtList;
  *numBPtList = localNumBPtList;
  *bpl = localBPtList;
  *fpl = localFPtList;
  if (allBack){
    *fpl = NULL;
    *numFPtList = 0;
  }
  if (allFront){
    *bpl = NULL;
    *numBPtList = 0;
  }
}/*EndOfFunction*/
```

What is claimed is:

1. A method for rendering an object in a computer system according to a first type of culling procedure, said object being represented by a plurality of polygon primitives, said method comprising:

receiving a plurality of polygon primitives, wherein said plurality of polygon primitives are represented by vertex data arranged according to an original order;

storing said vertex data in a memory of said computer system according to said original order, wherein vertices for a given one of said plurality of polygon primitives are stored in consecutive locations in said memory;

computing whether each of said plurality of polygon primitives is front-facing or back-facing relative to a predetermined viewpoint;

generating a first list of pointers to primitives and a second list of pointers to primitives, wherein said first list includes pointers to front-facing ones of said plurality of polygon primitives, and wherein said second list includes pointers to back-facing ones of said plurality of polygon primitives, and wherein said generating maintains said original order of said plurality of polygon primitives in said memory;

selectively conveying said first list and said second list to a graphics rendering pipeline within said computer system according to said first type of culling procedure;

said graphics rendering pipeline traversing said conveyed lists in order to access non-culled primitives from said memory;

said graphics rendering pipeline rendering said accessed primitives in order to display a representation of said object according to said predetermined viewpoint.

2. The method of claim 1, wherein said plurality of polygon primitives are arranged in strip format.

3. The method of claim 2, wherein said plurality of polygon primitives include triangle primitives.

4. The method of claim 1, wherein said selectively conveying includes conveying only said first list of pointers to said graphics rendering pipeline if said first type of culling procedure specifies that back-face culling is to be performed.

5. The method of claim 1, wherein said selectively conveying includes conveying only said second list of pointers to said graphics rendering pipeline if said first type of culling procedure specifies that front-face culling is to be performed.

6. The method of claim 1, wherein said selectively conveying includes conveying said first list of pointers and said second list of pointers to said graphics rendering pipeline if said first type of culling procedure specifies that neither front-face culling nor back-face culling is to be performed.

7. The method of claim 1, wherein said storing said vertex data in said memory is performed by a host processor of said computer system.

8. The method of claim 7, wherein said computing whether each of said plurality of polygon primitives is front-facing or back-facing relative to a predetermined viewpoint is performed by said host processor.

9. The method of claim 1, wherein said first list of pointers to primitives includes a first plurality of pointers to locations in said memory, wherein each of said first plurality of pointers specifies a memory location of at least one front-facing polygon primitive.

10. The method of claim 9, wherein said first list of pointers to primitives includes a size value for each of said first plurality of pointers, wherein each size value specifies a number of consecutive front-facing polygon primitives residing at said memory location specified by a corresponding one of said first plurality of pointers.

11. The method of claim 1, wherein said second list of pointers to primitives includes a second plurality of pointers to locations in said memory, wherein each of said second plurality of pointers specifies a memory location of at least one back-facing polygon primitive.

12. The method of claim 11, wherein said second list of pointers to primitives includes a size value for each of said second plurality of pointers, wherein each size value specifies a number of consecutive back-facing polygon primitives residing at said memory location specified by a corresponding one of said second plurality of pointers.

* * * * *